United States Patent
Solli et al.

(10) Patent No.: US 10,180,950 B2
(45) Date of Patent: *Jan. 15, 2019

(54) IMAGE RETRIEVAL AND PROCESSING SYSTEMS AND METHODS

(71) Applicant: FLIR Systems AB, Täby (SE)

(72) Inventors: Martin Solli, Tullinge (SE); Stefan Bergstrom, Täby (SE)

(73) Assignee: FLIR Systems AB, Taby (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/960,453

(22) Filed: Apr. 23, 2018

(65) Prior Publication Data

US 2018/0239784 A1 Aug. 23, 2018

Related U.S. Application Data

(63) Continuation-in-part of application No. 15/178,513, filed on Jun. 9, 2016, now Pat. No. 9,971,792.

(60) Provisional application No. 62/173,876, filed on Jun. 10, 2015.

(51) Int. Cl.
*G06K 9/62* (2006.01)
*G06F 17/30* (2006.01)
*H04N 5/33* (2006.01)

(52) U.S. Cl.
CPC .... *G06F 17/30268* (2013.01); *G06F 17/3028* (2013.01); *G06K 9/6215* (2013.01); *H04N 5/33* (2013.01)

(58) Field of Classification Search
CPC ..... G06F 17/30; G06F 17/30265; G06T 7/00; G06T 2207/10048; G06T 7/001; G01J 5/02; G06K 9/2054; G06K 9/3241
See application file for complete search history.

(56) References Cited

U.S. PATENT DOCUMENTS 7,732,768 B1 6/2010 Haigh et al.
9,971,792 B2 * 5/2018 Solli ................. G06F 17/30268
2013/0307992 A1 11/2013 Erlandsson et al.

* cited by examiner

*Primary Examiner* — Duy M Dang
(74) *Attorney, Agent, or Firm* — Haynes and Boone, LLP

(57) ABSTRACT

A method and an image processing system of processing thermal images captured using a thermal imaging system. The processing comprises determining a reference image depicting a scene and retrieving, from a number of thermal images comprised in a data storage, a set of one or more thermal images based on a predetermined similarity measure. A measurement location in the reference image is determined, and for each of the one or more retrieved thermal images: a corresponding measurement location in the respective retrieved thermal image is determined; and a thermographic tool is placed on the corresponding measurement location in the respective retrieved thermal image.

20 Claims, 11 Drawing Sheets

IMAGE RETRIEVAL AND PROCESSING SYSTEMS AND METHODS

CROSS-REFERENCE TO RELATED APPLICATIONS

This application is a continuation-in-part of U.S. patent application Ser. No. 15/178,513 filed Jun. 9, 2016, now U.S. Pat. No. 9,971,792 issued May 15, 2018, and entitled "IMAGE RETRIEVAL AND PROCESSING SYSTEMS AND METHODS," which in turn claims priority to and the benefit of U.S. Provisional Patent Application No. 62/173,876 filed Jun. 10, 2015 and entitled "IMAGE RETRIEVAL AND PROCESSING SYSTEMS AND METHODS," all of which are hereby incorporated by reference in their entirety.

TECHNICAL FIELD

The present disclosure relates generally to image retrieval and processing, and in particular, to systems and methods for content based retrieval of thermal images and processing of retrieved images.

BACKGROUND

Conventional thermography systems, or thermal imaging systems, typically include one or more infrared (IR) cameras possibly operated in conjunction with a computer, e.g. a personal or a laptop computer. Software typically runs on the camera and on the computer for providing various functionality relating to the capture, storage, transfer and manipulating of thermographic images and often also of corresponding visual images as well as of accompanying data. Thermography systems may comprise post-processing functionality within an IR camera or on an external processing unit, such as a laptop for performing post-processing. Thermography systems may typically be used for determining temperature or radiometric information for example for measurement, inspection, or surveillance purposes.

In applications where thermographic detection by means of thermal imaging and analysis are performed repeatedly on the same scene or on the same object in a scene, there are often inefficiencies and a high risk for error in the procedure of retrieving and processing thermal images.

There is a need for solutions that overcome the identified problems.

SUMMARY

The present disclosure comprises embodiments that may solve, or at least reduce, the problems described above. Embodiments of the disclosure comprise feature-based retrieval of images representing the same observed real world scene, selection or identification of one or more locations in a reference image, and determination of one or more corresponding locations in the retrieved images, as well as enabling the extracting of thermal data from corresponding locations.

Embodiments of the disclosure are useful in post-processing software applications, targeting frequent IR camera users having large collections of thermal images. Further, embodiments of the invention may be used on site when capturing images and/or in near real time.

Embodiments of the disclosure include a method of processing thermal images comprising: determining a reference image depicting a scene; retrieving, from a plurality of thermal images comprised in a data storage, a set of one or more thermal images based on a predetermined similarity measure; and determining a measurement location in the reference image. Further, these embodiments comprise, for each of the one or more retrieved thermal images: determining a corresponding measurement location in the respective retrieved thermal image; and placing a thermographic tool on the corresponding measurement location in the respective retrieved thermal image.

In further embodiments, the determining of the reference image is based on a control signal indicating a user selected reference image, or is based on predetermined rules for selecting a captured or previously stored image as the reference image.

In embodiments, the similarity measure describes a degree of similarity between the reference image and a compared thermal image. A thermal image may be retrieved from the data storage based on the fulfillment of the similarity measure.

In further embodiments, the determining of the measurement location in the reference image comprises receiving a control signal generated in response to a user input marking the measurement location in the reference image, and obtaining, in response to the control signal, one or more coordinates representing the measurement location. In other embodiments, the determining of the measurement location is based on the location of a thermographic tool in (e.g., placed on or otherwise associated with) the reference image.

In embodiments, the determining of the corresponding measurement location in the respective retrieved thermal image comprises applying a transformation function that describes the geometric relationship between the measurement location in the reference image and the corresponding measurement location in the respective retrieved thermal image.

In further embodiments, the placing of the thermographic tool comprises determining the thermographic tool in response to a user input control signal indicating the thermographic tool or determining a preset thermographic tool.

Some embodiments of the disclosure further comprise indexing of thermal images in the data storage based on image descriptors. In such embodiments, the retrieving of the one or more thermal images may further be based on said image descriptors.

Further embodiments comprise performing an analysis over time based on thermal image data extracted by the thermographic tool from the retrieved thermal images.

Embodiments of the disclosure comprise a thermal image processing system having a display configured to display one or more thermal images, one or more inputters configured to receive user input and to generate control signals in response to said received user input, and a processor. The processor is configured to determine a reference image depicting a scene; to retrieve, from a plurality of thermal images comprised in a data storage, a set of one or more thermal images based on a predetermined similarity measure; and to determine a measurement location in the reference image. The processor is further configured to determine a corresponding measurement location in the respective retrieved thermal image and to place a thermographic tool on the corresponding measurement location in the respective retrieved thermal image, for each of the one or more retrieved thermal images.

In further embodiments, the processor is configured to determine the reference image based on a control signal indicating a user selected reference image, or to determine the reference image based on predetermined rules for selecting a captured or previously stored image as the reference image.

In embodiments of the thermal image processing system, the similarity measure describes a degree of similarity between the reference image and a compared thermal image. One or more thermal images may be retrieved from the data storage based on fulfillment of the similarity measure.

In further embodiments of the thermal image processing system, the processor is configured to determine the measurement location in the reference image by: receiving a control signal generated in response to a user input marking the measurement location in the reference image; and obtaining, in response to the control signal, one or more coordinates representing the measurement location. In other embodiments, the processor is configured to determine the measurement location in the reference image based on the location of a thermographic tool in (e.g., placed on or otherwise associated with) the reference image.

In embodiments, the processor is configured to determine the corresponding measurement location in the respective retrieved thermal image by applying a transformation function that describes a geometric relationship between the measurement location in the reference image and the corresponding measurement location in the respective retrieved thermal image.

In further embodiments, the processor is configured to place the thermographic tool on the corresponding measurement location in the respective retrieved thermal image by: determining the thermographic tool in response to a user input control signal indicating the thermographic tool; or determining a preset thermographic tool.

In some embodiments, the processor is further configured to index the stored thermal images in the data storage based on image descriptors. In such embodiments, the processor may be configured to retrieve the one or more thermal images further based on said image descriptors.

In further embodiments, the processor is further configured to perform an analysis over time based on thermal image data extracted by the thermographic tool from the one or more retrieved thermal images.

According to further embodiments of an image processing system the processor is further configured to perform any of the method steps of the disclosure.

Further embodiments comprise a non-transitory machine-readable medium on which is stored machine-readable code which, when executed by a processor of a remote inspection system, control the processor to perform any of the method steps of the disclosure. Further embodiments comprise a computer program product having computer program code portions configured to control a processor to perform any of the method steps of the disclosure.

Further embodiments and examples of the disclosure are described in conjunction with the accompanying drawings.

BRIEF DESCRIPTION OF DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Introduction

Figure 1:
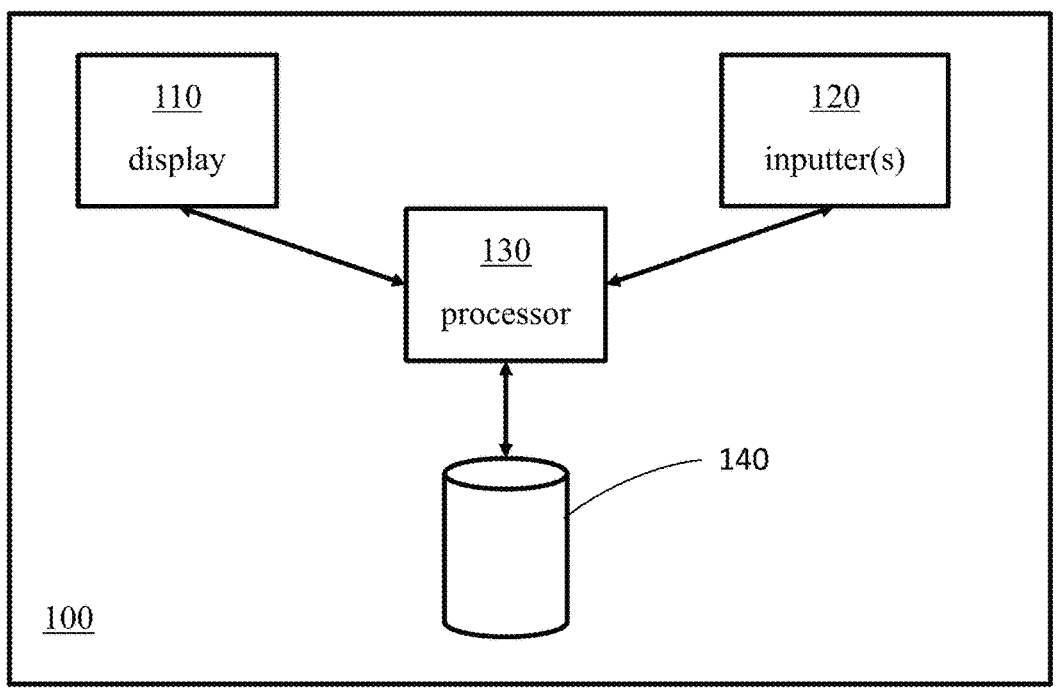
FIG. 1 shows a schematic view of a system in accordance with one or more embodiments of the disclosure.

Embodiments of the present disclosure provide methods, apparatuses and computer program products configured to find and retrieve previously captured and stored thermal images in a database representing or depicting the same scene and/or the same or similar objects or features. Further, embodiments are provided to enable placement of thermographic tools in corresponding locations in the retrieved images. Corresponding locations are locations in different images that represent the same object or the same portion of a depicted real world scene. Identification of corresponding locations and placement of thermographic tools enable scene comparison over time, possibly automatic scene comparison, as provided by further embodiments of the disclosure. Scene comparison over time enables and is used for e.g. detection of deviations and/or trend analysis of thermally detectable phenomena in an observed scene.

Thermal images, in accordance with embodiments of the present disclosure, are images comprising representations of thermal wavelength radiation from a real world scene, possibly combined with visual wavelength representations of the scene. A thermal image may thus comprise visual image data combined with thermal image data.

Thermography systems may include one or more infrared (IR) cameras possibly operated in conjunction with a computer, e.g. a personal or laptop computer. Software runs on the camera and on the computer for providing various functionality relating to the capture, storage, transfer and manipulation of thermographic or thermal images and often also of corresponding visual images as well as of accompanying data. Thermography systems may be used for measuring temperature or determining radiometric information. Thermography systems may comprise post-processing functionality within an IR camera or on an external processing unit, such as a PC or laptop for performing post-processing.

Retrieving temperature reading(s) or other desired thermal data of interest from an image may involve applying one or more thermographic tools (e.g., software and/or hardware operations that are performed on or performed using at least a portion of a thermal image) to one or more thermal images. For example, thermographic tools may include a spot temperature tool, a maximum temperature tool, a minimum temperature tool, an area tool, and/or other tools that operate on or use thermal images (e.g., by placing on, applying to, or otherwise associating with one or more measurement locations in thermal images). Generally, these thermographic tools extract the corresponding respective thermal image data, radiometric, temperature or other IR related information associated with the image coordinates or pixels representing the measurement location from the thermographic image file. For example, a spot tool determines the radiometric, temperature or other IR related information associated with an exact spot or coordinate on the image, a maximum temperature tool determines the maximum radiometric, temperature or other IR related information represented by the thermal image or within a selected portion of the thermal image, an area tool determines e.g. the maximum, minimum, mean and/or median radiometric, temperature or other IR related information associated represented by a selected area on the image, and so on. Thermographic tools may be placed on images in an operation with the camera, for example when capturing an image or when post-processing stored images, or in an operation with a computer working with post-processing of stored images.

In applications where thermographic detection, measurement, or analysis is performed repeatedly on the same scene, there is often a need to place thermographic tools on a particular position or on a particular object in the scene in a number of images captured at different points in time. This can be done in connection with the capturing of images or in post-processing operating on stored images. In both cases there is in some technology a substantial amount of manual handling, a high risk for errors, a high risk for inexact positioning of thermographic tools, and poor alignment between images.

Good alignment is important, for example, when performing scene comparison over time by making statistics and trend analysis on thermal images. For this purpose, thermal images depicting the same scene are identified and retrieved from a collection of stored images. Some technology supporting alignment between images associated from this point of view may be time consuming to work with and inflexible regarding image capturing and image storage.

Locating thermographic tool(s) manually (e.g., by manually inputting an indication or designation of a specific pixel location, area, or portion of thermal images) on a number of thermal images is generally a painstaking process that requires each image to be worked individually, in particular when thousands of images are stored in a database. This may be partially solved by assisting the user in aligning images to be captured with a reference image, wherein after any thermographic tools located in the reference image are placed on the same image coordinate(s) in the new captured image. However, this requires a lot of manual handling, which is time consuming and tedious for a user. It is further an inexact method, as the risk of introducing human error is always present. Furthermore, alignment solutions require that the user knows at the moment of capturing an image that the image is going to be processed jointly with other images depicting the same scene. Typically such solutions therefore also require that the images to be processed jointly, sometimes referred to as a series of images which indicates that they are already grouped, are stored in a common folder or in other ways associated in order to enable later retrieval.

Once a series of thermographic images has been captured, downloaded to a computer or data storage, it may be useful to create trend plots of the temperature data contained in those images. Trend plots may involve determining one or more desired temperatures, e.g., a maximum, minimum or average temperature, or a temperature at a desired location, for each of the images and then plotting these temperatures against time based on the time of capturing the respective images.

In order to be able to compare images and use corresponding measurement for e.g. trend analysis over time, the images to be compared must be correlated, for example pre-aligned by making sure that images to be compared are captured using the same or similar imaging devices, from the same direction and distance, such that they depict a common object in as similar a manner as possible. This may be achieved through the use of a stationary imaging device or through schemes assisting the user of a handheld camera to capture images from the same location every time, e.g. by giving directions or showing an overlay with a reference image via a graphical user interface GUI. Embodiments of the disclosure comprise alternatives to pre-aligning thermal images.

System Embodiments

FIG. 1 shows, on a general level, components comprised in a thermal image processing system in accordance with one or more embodiments. A thermal image processing system comprises hardware and/or software components configured for applying one or more operations to thermal image data. In embodiments as illustrated in FIG. 1, a thermal image processing system 100 comprises a display 110 configured to display one or more thermal images, one or more inputters 120 configured to receive user input, a processor 130 configured to process image data and control data, and a data storage 140 configured for storing thermal images. The inputter 120 is typically configured to interpret received user input and to generate control signals in response to said received user input. For example, an inputter may be realized in an IR camera or in a general computer as a tool with associated functionality configured for being actuated by a user via a touch screen, a cursor or a designated button. The processor 130 is for example a general data processor, an FPGA (field programmable gate array) or other circuit or integrated circuit capable of executing instructions to perform various processing operations. In different embodiments, the processor 130 is configured to perform any of the method steps and functions described herein. The thermal image processing system 100 may comprise either of an IR camera or a data processing device, or a combination thereof.

Figure 2:
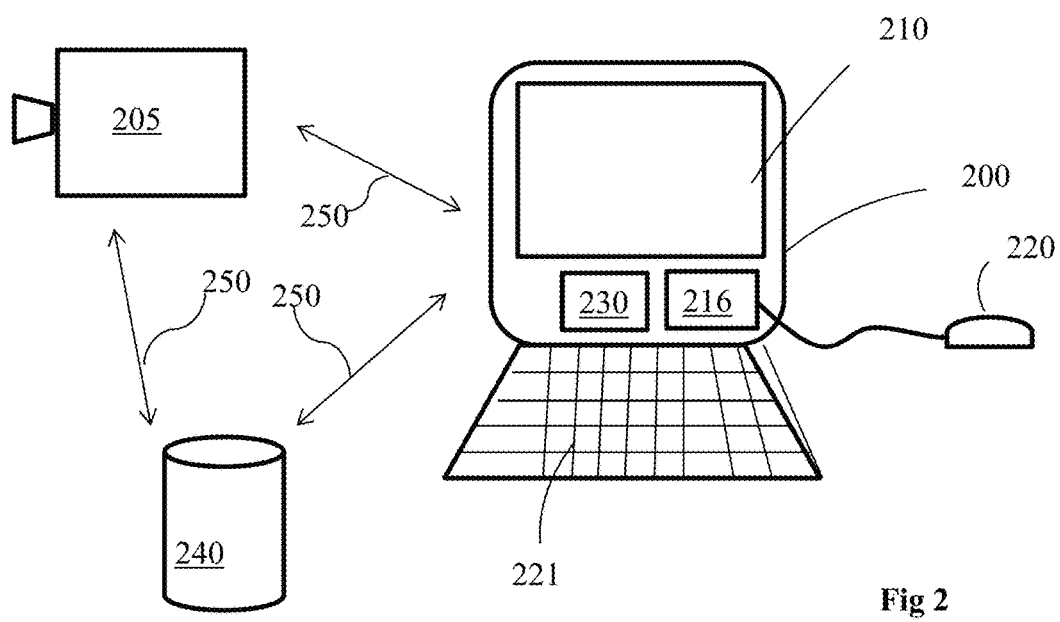
FIG. 2 shows a schematic view of a system in accordance with one or more embodiments of the disclosure.

In one or more embodiments, as illustrated in FIG. 2, a thermal imaging system 100 (as shown in FIG. 1) comprises a selection of an IR camera 105, a data processing device 200 configured for processing thermal images captured by an IR camera and a database 240 configured for storing thermal images. The IR camera 105, the data processing device 200 and the database 240 are communicatively couplable, e.g. by a wired or wireless data transmission line or data communications network 250.

In embodiments the data processing device 200 comprises a processor 230, e.g. a CPU, a microcontroller or other circuit or circuit capable of executing instructions to perform various data processing operations. In embodiments the data processing device 200 further comprises a display 210 configured to display one or more thermal images, and one or more inputters. The inputters comprises functionality 216 configured to receive, interpret and generate control signals in response to user input via an input interface such as a pointer device 220 or a keyboard 221. In different embodiments, the data processing device 200 may be configured to perform any or all of the method steps and functions described herein.

Method Embodiments

According to embodiments of the disclosure, there is provided a method, comprising variant embodiments further described in connection with the figures, for processing one or more thermal images using a thermal imaging system.

According to embodiments, a set of thermal images is retrieved from a data storage making up an IR image database based on a similarity or a degree of similarity of the retrieved thermal images with a predetermined or a selected reference image, preferably a thermal reference image. The similarity of a retrieved thermal image with the reference image is based on a similarity measure determined in relation to and in comparison with the reference image.

In the present disclosure, the term reference image refers to a thermal image of an observed real world scene captured using an IR camera. A reference image is used as a query image when searching and retrieving thermal images in an IR image database and the terms reference image and query image may be used interchangeably in the present disclosure.

Similarity between thermal images, and in particular between a reference image and a retrieved image, is in embodiments of the present disclosure determined based on the thermal image data or image pixel data, wherein images with thermal image data or thermal image pixel data, e.g. pixel values, that has a high probability of representing the same observed real world scene as the reference image are considered similar. In some embodiments, the image data or image pixel data for each image may additionally or alternatively be in the form of one or more image descriptors. In such embodiments, comparison of image descriptors is used for finding images that are similar according to a certain preset criterion or criteria. In some embodiments wherein comparison of image descriptors is performed, to obtain a similarity measure, images with image descriptor(s) that correlate to a high degree, are considered to be similar and are thus interpreted as representing the same real world scene or object, e.g., depending on what is investigated. Examples of such similarity measures are image distance measures in various dimensions such as color, texture, shape, and others. Another example of such a similarity measure is a shape measure calculated using a Fourier transform or one or more image moments for example in the form a selected weighted average of image pixel intensities.

In different embodiments, an image descriptor may describe an entire image called a global descriptor or may describe a portion (e.g., sub-regions) of an image called a local descriptor. An image descriptor may be indicative of characteristics associated with the content of the image and may be determined using image analysis. As an example, the global descriptor may describe frequency content of the entire image. A described portion may be automatically or predeterminedly selected, for example, to represent a set of image coordinates in the center of the image, or any other suitable portion of the image, or be selectable by a user using one or more inputters 120 of the thermal imaging system 100. In some embodiments, a global image descriptor may comprise a set of local image descriptors that represent different sub-blocks or parts of the image, wherein the set of local image descriptors together may represent the entire image. In some embodiments, an image descriptor may describe an identified object in an image, the object being identified automatically by the processor using per se known image processing methods. In some cases, an image descriptor may contain numerical values. The numerical values may be stored in a vector format, a matrix format, or any appropriate format for storing/representing the numerical values that form the image descriptor. By way of non-limiting example, the numerical values may be, or may be indicative of, characteristics of the content of the image, such as frequency, color, texture, shape, and/or other characteristic. The characteristics may be determined by performing image analysis on the image.

An example of a similarity measure that may be used in embodiments is based on an L2-norm or Euclidean norm as would be understood by one skilled in the art. Whether a thermal image represents the same real world scene or object as the reference image may for example be determined by: comparing one or more numerical values calculated from the image pixel data for each image in a database to one or more numerical values calculated from the image pixel data for the reference image; determining the difference(s) between said numerical values; and comparing the difference(s) to a threshold value. The threshold value may for example be a probability value that must be exceeded in order for a thermal image to be determined to represent the same real world scene as the reference image. In some embodiments, the numerical values may be provided by one or more image descriptors. In this regard, the thermal image and the reference image each includes one or more image descriptors. The similarity measure between the thermal image and the reference image may be based on differences between corresponding image descriptors of the thermal image and reference image and/or comparisons of these differences with one or more threshold values. The image descriptor(s) may be stored as a portion of an image file (e.g., the image file includes the image and the image descriptor(s)), linked to the image file, or otherwise associated with the image file (e.g., in a database structure).

The similarity approach described above may be a modification and/or further development of a concept in the field of image processing referred to as Content-based image retrieval (CBIR), also called query by image content (QBIC) and content-based visual information retrieval (CBVIR). Instead of searching for images using for example metadata, such as date, time, file name, tags, GPS coordinates, etc., the image search and retrieval is based on image content, like patterns, colors, objects in the scene, etc., described in image descriptors. Such image descriptors are generated using image analysis algorithms. Generating image descriptors may be performed based on settings of the thermal imaging system if performed in real time e.g. during capturing of thermal images or operating on images in a data storage with an IR camera, or based on settings of a post-processing computer program run on a data processing device and operating on images in a data storage. As such, in some embodiments, image recognition and classification tasks based on image analysis (e.g., automated image analysis) may be based on one or more of the image descriptors associated with image files.

A typical result after the retrieval of images is a first set of images. The first set of images may in some embodiments be ordered based on the calculated similarity to the reference image as represented by a similarity measure, according to descending or ascending similarity to the reference image.

In some embodiments, a second set of images may be selected from the first set of images, wherein the second set of images is a subset of the first set and includes only the images that are most likely to represent the same observed real world scene. Such limitation may be performed in relation to a threshold value, e.g. by comparing the obtained similarity measure value of each image in the first set of images to the threshold value and include the image in the second set of images if the similarity measure value is above, or equal to or above, the threshold value. In other embodiments, a user may be enabled to select the second set of images from the first set of images, e.g. by selecting one or more images from the first set whereby a corresponding number of the most similar images according to the similarity measure value are selected for the second set of images. In some embodiments, the user may be enabled to adjust such a threshold value via a graphical user interface commonly called a GUI of the thermal imaging system. In some embodiments, the user may be enabled to freely select via the GUI using one or more inputters 120 of the image processing system 100 among the images of the first set by selecting/marking the visual representations of one or more of the images of the first set, which are presented via the GUI. In such an embodiment, the second set will consist of the user selected/marked images.

A combination of two or more of said options is also possible and provided for in embodiments. In these embodiments, the method may comprise, and the processor 130 may be configured to perform, receiving input from one or more inputters 120 in response to a user interacting with said one or more inputters 120 and selecting a second set of images from the first set of images based on the input.

Having a set of retrieved thermal images satisfying a similarity measure criterion in relation to a reference image, embodiments comprises determining a measurement location of or for a thermal measurement operation in the reference image, determining corresponding measurement locations on the retrieved thermal images and applying the thermal measurement operation on a selection of the retrieved images. This enables scene comparison between the retrieved thermal images, for example over time for a trend analysis.

Figure 3:
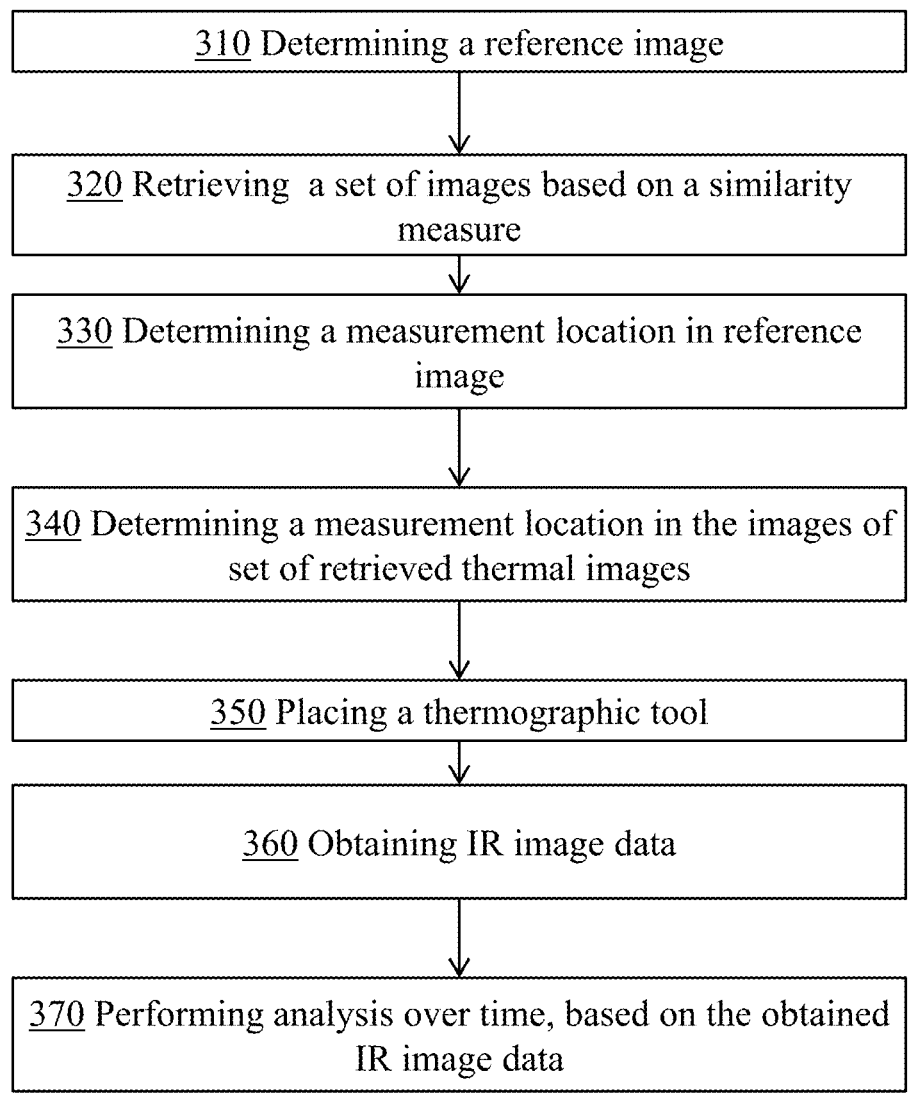
FIG. 3 shows a flow diagram of a method for thermal image retrieval and processing in accordance with one or more embodiments of the disclosure.

In embodiments, there is provided a method as illustrated in FIG. 3 of processing thermal images captured using a thermal imaging system. The method comprising the following:

Step 310: Determining a reference image depicting a scene. In embodiments, determining a reference image comprises receiving a control signal in a processor indicating the selection of a reference image depicting a scene according to predetermined rules.

In some embodiments, the determining of a reference image is triggered by and in response to the capturing of a thermal image by means of an IR camera and an associated generation of a corresponding selection signal, wherein the captured thermal image is set as the reference image.

In some embodiments, the determining of a reference image is triggered by the selection of a thermal image from a number of previously captured and stored thermal images and the generation of a corresponding selection signal, wherein the selected thermal image is set as the reference image. In such embodiments, the signal indicating the determining of a reference image depicting a scene is generated in response to a selection input received from an inputter of the thermal imaging system, triggered by a user interacting with the inputter.

The capturing of a thermal image and/or the determining of a thermal image as a reference image may be performed automatically in accordance with pre-settable rules, such as rules that are dependent on a predetermined shape or thermal image feature, or in response to user input. For example, a user provides input to an IR camera or data processing system configured for post-processing of thermal images thereby indicating the selection of a reference image also called a query image, which may be a newly captured image or an image already included in the database.

If the reference image/query image has not been already stored in the database and/or provided with an image descriptor, the method may further comprise generating an image descriptor for the reference/query image, as further explained below.

Step 320: Retrieving, from a number of thermal images comprised in a data storage, such as a database, a set of one or more thermal images based on a similarity measure determined in relation to the reference image. The similarity measure describes, for each of the retrieved one or more thermal images in the first set of thermal images, the similarity or the degree of similarity between the reference image and the retrieved thermal image, as described above.

In embodiments, the thermal images comprised in the retrieved set of thermal images are representations of the same scene. In other embodiments, the retrieved set of thermal images comprises an object or a feature satisfying a predetermined similarity measure criterion.

Step 330: Determining a measurement location in the reference image. The reference image is provided with a measurement location, i.e. a location in the image for a thermal measurement operation.

In embodiments, the measurement location in the reference image is in the form of one or more image coordinates. In some embodiments, determining a measurement location comprises receiving a control signal generated in response to user input, such as to mark a measurement location, and obtaining in response to the control signal one or more coordinates representing the measurement location.

In some embodiments, the method further comprises placing a thermographic tool on said measurement location in the reference image. This may be performed in response to user input of a control signal or dependent on predetermined rules.

In some embodiments, determining a measurement location comprises determining the location of a thermographic tool already or previously placed on the reference image, or by retrieving thermographic tool location information stored in the thermal image file, or thermographic tool location information being associated with and stored in connection with the thermal image file. Thus, determining a measurement location is in embodiments based on the location of a thermographic tool present in the reference image.

As discussed herein above, a thermographic tool is a tool (e.g., software and/or hardware routines, operations, or modules) that can be associated with (e.g., placed or applied to) image coordinates or pixels representing the measurement location to extract or obtain, from thermal images (e.g., from thermal image files), thermal image data, radiometric, temperature or other IR related information associated with the measurement location. The measurement location may for example be described or defined by image coordinates or pixels representing the measurement location.

Step 340: Determining, for each of or a selection of the retrieved one or more thermal images in the retrieved set of images, a corresponding measurement location in the respective thermal image.

This is carried out by applying a transformation function describing the geometric relationship between the reference image and the retrieved thermal image. A corresponding location in two thermal images is, in embodiments of the disclosure, one or more image coordinates in the first image and one or more image coordinates in the second image that represent the same location (e.g., including a substantially same location, considering errors or variations typically introduced by image capturing and/or image processing operations) in the depicted real world scene, or the same or corresponding object or feature in the thermal images. Thus, by retrieving measurement information associated with the corresponding image locations in the two or more images, comparison or any other desired calculation based on the retrieved measurement information can be used for analyzing the same location, e.g. point, area, object or feature in the depicted real world scene.

The geometric relation between the images may be described using one or more of the following parameters: rotation, translation, scale and skew. A transformation function may be in the form of a transformation matrix or other transformation relation, and describes the relation between the reference image and each of the respective thermal images in the set of one or more thermal images.

In embodiments, a transformation matrix, a transformation function or a transformation relation is determined by detecting points of interest in the reference image, e.g. by identifying a region, an area or an object of interest based on detected edges, corners or patterns, then detecting points of interest in one or more thermal images in the retrieved set of thermal images, and determining or calculating a transformation function, e.g. by optimizing parameters of a rigid body transformation over an objective function, such as using least mean square or other approximation methods.

In embodiments, a transformation function is calculated and associated with each thermal image in the retrieved set of images. For example, transformation function is associated with a thermal image, having or being provided with an image identifier, by associating said transformation function to said thermal image.

In embodiments, the corresponding measurement location in the thermal image is in the form of one or more image coordinates, and the transformation function describes the geometric relationship of coordinates in the reference image and corresponding coordinates in the retrieved thermal image. In these embodiments, determining a corresponding measurement location in each of the retrieved one or more thermal images of the set of retrieved thermal images comprises applying the transformation function, e.g. applying a geometric transformation as described by the transformation function, on the measurement location in the reference image to obtain the corresponding measurement location in each of the retrieved thermal images.

Step 350: Placing, in each of the retrieved one or more thermal images in the retrieved set of images, a thermographic tool on the respective determined corresponding measurement location. This advantageously enables measurement or calculation of a selected parameter related to a corresponding point, area, object or feature in the observed real world scene based on thermal image data in the corresponding measurement location of the retrieved thermal image.

Some embodiments further comprise,

Step 360: Obtaining thermal image data from each or from a selection of the retrieved thermal images, preferably via the thermographic tool. For example, such thermal image data may include the temperature value in the point or feature of the real world scene represented in the respective retrieved thermal images.

Thus, in one or more embodiments, step 360 may include obtaining, retrieving or extracting thermal image data, image pixel data or pixel data associated with the corresponding measurement location, wherein the thermal image data, image pixel data or pixel data is extracted by the thermographic tool, e.g. for a single pixel by a hairs cross or aggregated from multiple pixels by an area based tool such as a circle or rectangle.

Further embodiments comprises,

Step 370: Performing analysis of an imaged scene over time, by comparing the obtained thermal image data, image pixel data or pixel data from retrieved thermal images depicting a scene and being captured at different points in time. Such an analysis over time, for example in the form of a trend analysis, may be based on thermal image data extracted by the thermographic tool from the retrieved thermal images.

Figure 4:
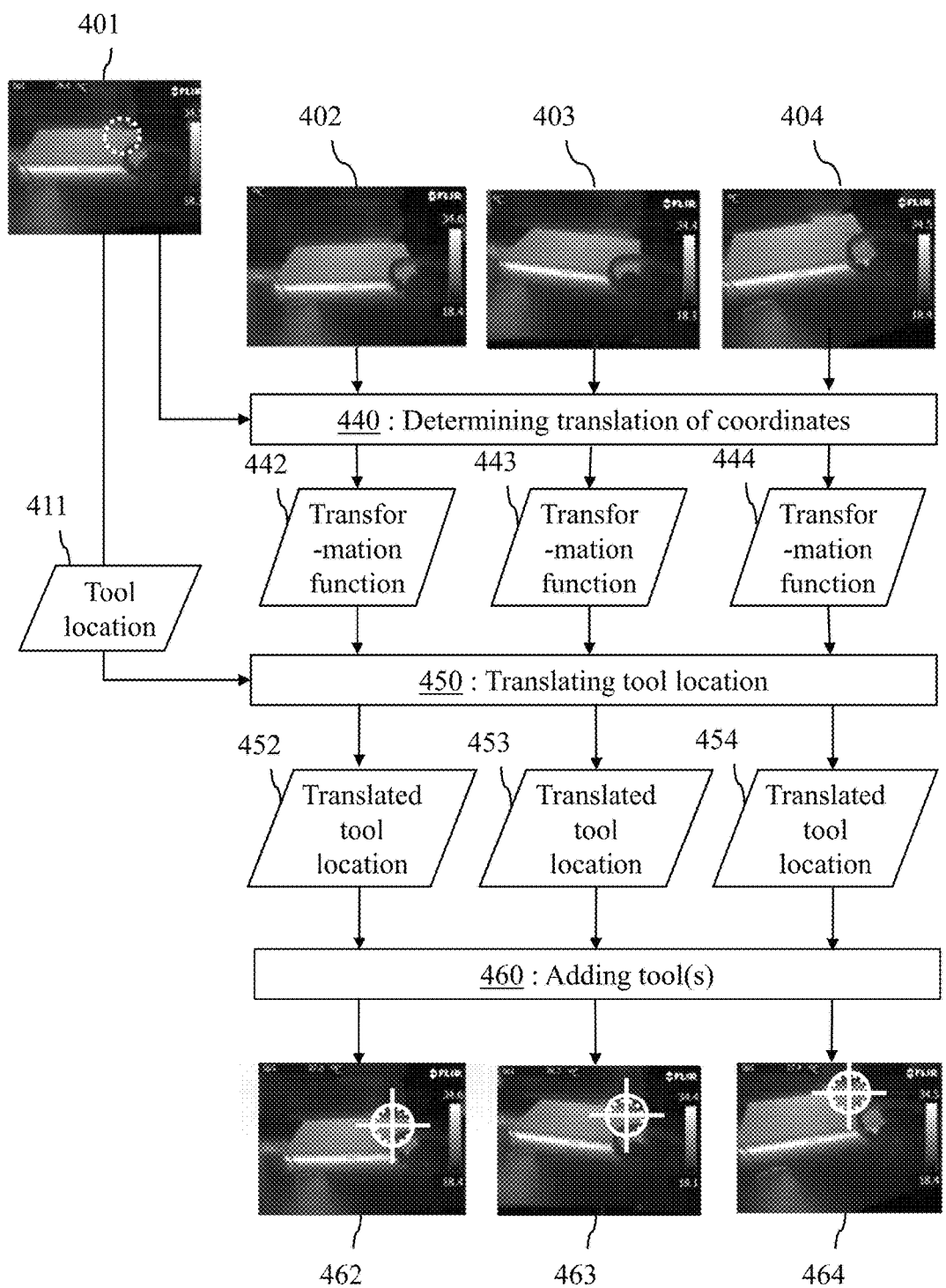
FIG. 4 shows a flow diagram of a method for thermal image processing in accordance with one or more embodiments of the disclosure.

FIG. 4 further illustrates embodiments of method steps described in FIG. 3. In FIG. 4, a reference image 401 and a set of retrieved thermal images, here exemplified by the retrieved thermal images 402, 403, 404, are input into a method step 440 of determining translation of coordinates for a measurement location (e.g., comprised in the method step 340 of FIG. 3 of determining measurement locations in retrieved thermal images). The output from step 440 is a set of transformation functions 442, 443, 444, one for each of the input thermal images in the first set of retrieved thermal images. The transformation functions represent the geometric relation between the reference image and the respective thermal images of the first set of thermal images. Here the set of transformation functions are exemplified by the transformation functions 442 representing the relation between reference image 401 and thermal image 402, 443 representing the relation between reference image 401 and thermal image 403, and 444 representing the relation between reference image 401 and thermal image 404.

The transformation functions 442, 443, 444, along with a measurement location, possibly a measurement tool location 411 describing the location of a thermographic tool in the reference image 401 as determined in step 330 of FIG. 3, are input into the method step 450 of translating a tool location (e.g., comprised in the method step 350 of placing thermographic tools in FIG. 3). In the translation step 450, the location 411 of a measurement location possibly of a thermographic tool located on the reference image is translated into translated tool locations 452, 453 and 454 in thermal images 402, 403 and 404 respectively, based on the respective transformation function 442, 443 and 444. The translated tool locations 452, 453 and 454 correspond to what is called corresponding measurement locations in the description of FIG. 3.

In the subsequent step 460 (e.g., comprised in steps 350 and/or 360 of FIG. 3), a thermographic tool is added to and placed at the determined tool locations on each of the thermal images 402, 403 and 404, as illustrated in the updated thermal images 462, 463 and 464, wherein the added thermographic tools, here exemplified by spot or hair cross tools, are shown. In FIG. 4, the thermographic tools added to the retrieved thermal images are highlighted by white dashed circles for visibility. The thermographic tool may be added automatically to each respective thermal image, by the thermal imaging system 100 (as shown in FIG. 1), the adding being triggered by the determination of the respective translated tool location. Alternatively, the thermographic tool may be added in response to user input, e.g. a "copy to all" selection signal generated by the user, using the GUI, and received by the thermal imaging system 100 via one or more inputter 120 (as shown in FIG. 1).

Figure 5:
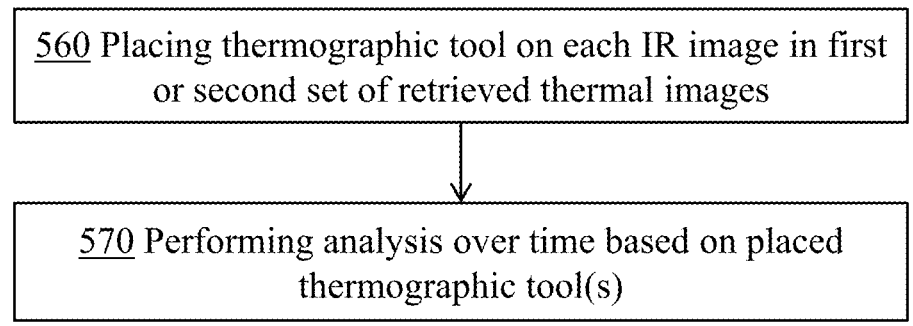
FIG. 5 shows a flow diagram of a method for thermal image processing in accordance with one or more embodiments of the disclosure.

FIG. 5 briefly illustrates embodiments configured to perform analysis of a selected image feature over time in a set of retrieved images. A second set of retrieved images may be selected as a subset based on a second selection or threshold criterion applied to a first set of retrieved images. Such embodiments may comprise:

Step 560: Placing one or more thermographic tool on each thermal image at a determined measurement location in on or both of the first or second set of retrieved images.

Step 570: Performing analysis over time based on measured or calculated values of the measurement function coordinates in the first or second set of retrieved thermal images. The measured or calculated values are obtained via the thermographic tool.

The term thermographic tool location, or tool location, is in embodiments to be understood as a location or coordinate position in the captured thermal image where a thermographic tool is located and/or for which a measurement value is measured, calculated or retrieved. In some embodiments relating to thermography and thermal imaging, the measurement value is the temperature value of one or more point in the observed real world scene corresponding to the location or coordinate(s) in the analyzed thermal image. The temperature value is measured or calculated by the IR camera based on thermal radiation received by an IR sensor of the IR imaging system, in manners per se known in the art. The location or coordinate may be represented visibly, as illustrated in the updated thermal images 462, 463 and 464 (as shown in FIG. 4) as a marker in the form of a hair cross. A hair cross marker showing the location of a single coordinate in the image is commonly referred to as a spot marker. Other examples of commonly used thermographic tool markers in the art of thermal imaging are area markers that show the location of an area or portion of the image representing more than one coordinate. The area marker may have any suitable shape and size.

Figure 6:
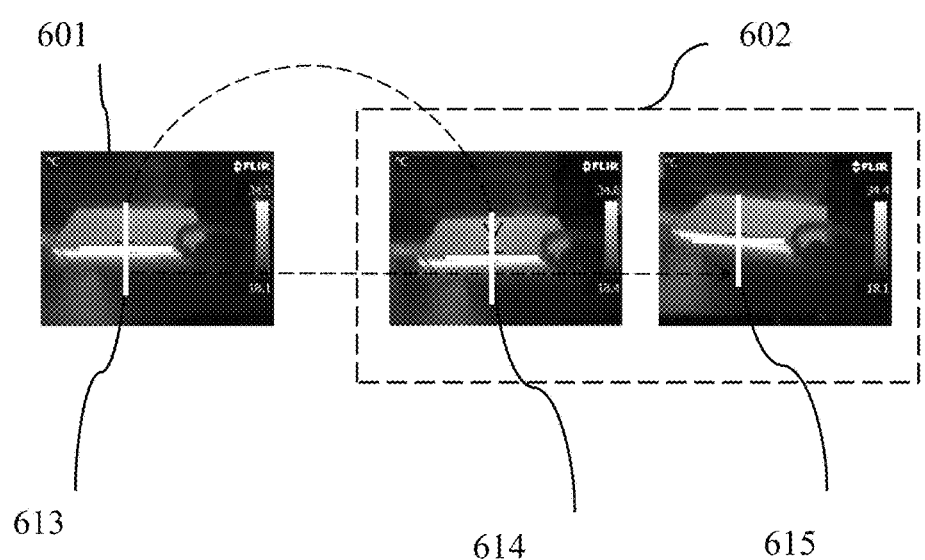
FIG. 6 shows a flow diagram of a method for placing a thermographic tool in accordance with one or more embodiments of the disclosure.

Further embodiments for adding thermographic tools to a retrieved set of thermal images is shown in the flow diagram of FIG. 6, wherein the thermographic tool 613 of reference image 601 is translated to generate the location of a corresponding thermographic tool 614 in the first thermal image of a retrieved thermal image set 602 using a first transformation function, and translated to generate the location of a corresponding thermographic tool 615 in the second thermal image of the thermal image set 602 using a second transformation function.

This may be exemplified by:

$$A_1^*(x,y)=(x_1,y_1) \quad \text{(Eq. 1)}$$

and $$A_2^*(x,y)=(x_2,y_2) \quad \text{(Eq. 2)}$$

wherein (x,y) is the location, represented as image coordinates, of the thermographic tool 613 in the reference image 601; $(x_1, y_1)$ is the location, represented as image coordinates, of the thermographic tool 614 in the first thermal image of the first thermal image set 602; $(x_2, y_2)$ is the location, represented as image coordinates, of the thermographic tool 615 in the second thermal image of the thermal image set 602; and $A_1$ and $A_2$ are the respective transformation functions. In equations 1 and 2, the locations are exemplified as a pair of image coordinates. The location may in embodiments comprise one or more pairs of image coordinates, representing a spot or an area in an image, the area having any suitable shape and size.

As explained herein, the use of a transformation function for translating coordinates in the reference image to the same scene location (identifying the same spot, area or object, for example) in images in the search result (e.g. the first or second set of thermal images), will make it possible to automatically perform measurements on the same spot, area or object in all selected images. This may in some embodiments be used for analysis over time, as further described in connection with FIGS. 5 and 11. According to one or more embodiments described herein, the images of a set of retrieved thermal images may be displayed to the user on a display of a thermal imaging device i.e. an IR camera, or a data processing system forming an external processing unit.

In embodiments, the method comprises finding a geometric transformation between two images, or in other words determining how the location of a real world feature, part, point, area or object of interest in the reference image is related to the location of the same real world feature, part, point, area or object in the thermal images that are to be compared to the reference image, e.g. all thermal images stored in one or more databases. The derived transformation function can be used for translating a coordinate in the reference image, to a coordinate in a second image, e.g. an image comprised in the first or second set of thermal images. In some embodiments of the present disclosure, the transformation function is applied to thermographic tools (e.g., visually presented as spot markers, areas, or other visual representations), which makes it possible to automatically measure, retrieve or calculate one or more predetermined features or values associated with the same portion of the observed real world scene using several thermal images captured at different points in time, and possibly also captured from slightly different viewpoints and/or distances.

In some embodiments, the determining of a translation of method step 340 and placing of thermographic tool of method step 350 comprises deriving a geometric relationship, such as rotation, translation, scale, etc., between the reference image and each retrieved thermal image in the first or second set of images to determine a transformation function describing the geometric relation between the images. By applying the transformation function on the coordinates of one or more thermographic tools in the reference image, the method derives where the one or more thermographic tools should be added to the respective retrieved thermal image of the set of retrieved thermal images, and adds the one or more thermographic tools in appropriate locations on each image of the set of retrieved thermal images based on the respective transformation functions associated with each of the images of that set.

Figure 7:
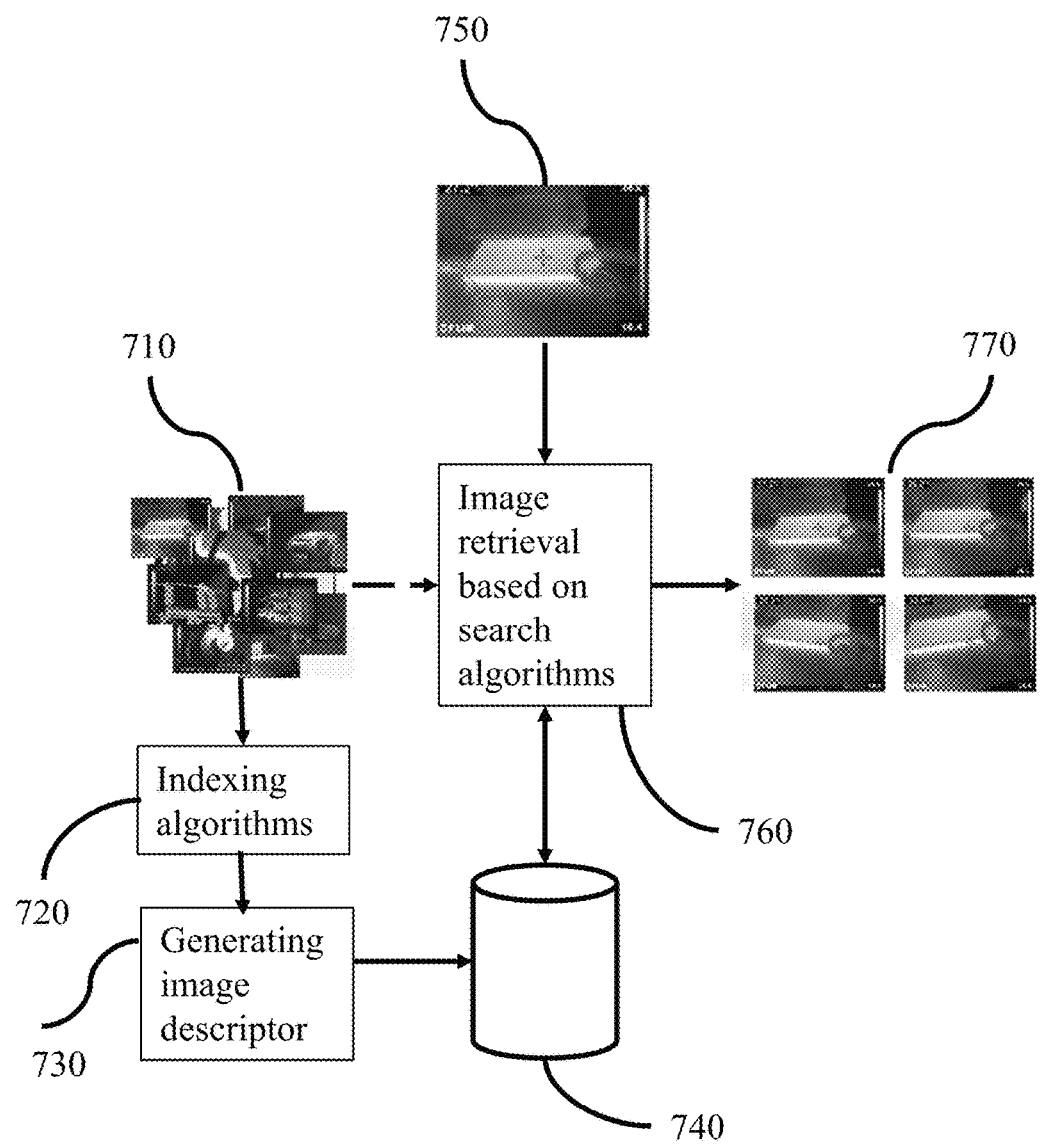
FIG. 7 shows a flow diagram of a method for thermal image indexation and retrieval in accordance with one or more embodiments of the disclosure.

FIG. 7 shows a flow diagram of a method for thermal image indexation and retrieval, according to embodiments comprising, for each of one or more thermal images 710:

Step 720: Indexing the thermal image.

Indexation may be performed using any suitable indexing algorithm according to techniques per se known in the art. The index may be stored as a portion of the image file, linked to the image file, or otherwise associated with the image file in the database structure.

Step 730: Generating and storing, in the database 740 or other memory or data storage, an image descriptor associated with the image. Generation of an image descriptor may be done in any suitable manner, for example using a GIST descriptor with 512 entries for each image. The image descriptor may be stored as a portion of the image file, linked to the image file, or otherwise associated with the image file in a database structure.

An image descriptor may be a global descriptor utilized to describe an entire image or may be a local descriptor utilized to describe a portion (e.g., sub-regions) of an image. In some cases, an image descriptor may contain numerical values. The numerical values may be stored in a vector format, a matrix format, or any appropriate format for storing/representing the numerical values that form the image descriptor. In one example, the image descriptor may contain a few hundred numerical values.

In some embodiments, image descriptor(s) generated based on an image may be included within (e.g., embedded within, stored as a part of) an image file format, alternatively or in addition to storing the image descriptor(s) separate from the image (e.g., image descriptor(s) of an image are linked to the image and stored in a database entry). In this regard, the image file is of an image file format appropriate for including the image as well as the image descriptor(s). In an aspect, the image file format may be an IR image file format appropriate for representing/storing IR image data, such as thermal image data, and associated data (e.g., image descriptor(s)). In some cases, embedding of the image descriptor(s) in the image file may facilitate moving/copying the image file (e.g., IR image file) to another storage device. For example, the image file may be moved/copied to another storage device without a need to retrieve, copy, or re-calculate the image descriptor(s) (e.g., as in the case in which the image file includes the image but not the image descriptor(s)).

In some aspects, image descriptors for an image may be derived in an imaging system (e.g., in the camera) using appropriate software, hardware, etc. and added to an image file when the image is captured and saved in the image file, or the image descriptors for the image may be derived later and added to the image file after capture of the image. For instance, after capture of the image and storage of the image as part of an image file (e.g., an image file without image descriptors), the image descriptors may be derived using appropriate software (e.g., application software, cloud service, etc.) and added to the image file.

Step 760: Retrieving images. After indexation and generation of image descriptors, image retrieval based on a reference image 750 and a search algorithm, to retrieve a set of retrieved thermal images here represented by the set 770, may be performed according to any of the embodiments described herein.

In one example, an image descriptor is obtained or determined for a thermal reference image and sent in a query to a database 740. The image descriptors of the number of candidate thermal images comprised in the database 740 are then matched with the image descriptor of the query reference image. The most similar thermal images, i.e. the ones with the highest similarity measures e.g. over a predetermined threshold, will be retrieved. Thus, the system can efficiently retrieve the most similar images from the database 740 and simultaneously reduce the retrieval time and the required storage space. In this manner, the image descriptors of the thermal reference image and the candidate thermal images are utilized to facilitate image recognition and classification. The image descriptors may include numerical image descriptors, which may be stored as/represented in a vector format, a matrix format, or other format appropriate for storing/representing numerical values.

In embodiments, the thermal images comprised in a data storage are at least partly indexed based on image descriptors and retrieving the set of one or more thermal images is based on said image descriptors.

Indexation and/or generation of image descriptors may be performed for an entire database or other storage before retrieval of images is requested. Alternatively, it may be done for one or more thermal images being uploaded to a computer, database, server or the like in response to a request for image retrieval.

Embodiments where every thermal image is indexed (e.g., including generating image descriptors in some embodiments) at least once, even very large databases such as those comprising hundreds of thousands of stored images, allow the calculation of similarity measures to be performed in near real-time.

In some embodiments, visual representations of a selection of or all thermal images in a retrieved set of thermal images, and possibly also the reference image, are displayed to a user via a graphical user interface (GUI). Thus, a user is enabled to check, measure and analyze the same spot, area, feature, object or the like of the depicted real world scene in all processed images. Some non-limiting examples of how thermal images may be displayed in a GUI are shown in FIG. 8-10.

Figure 8:
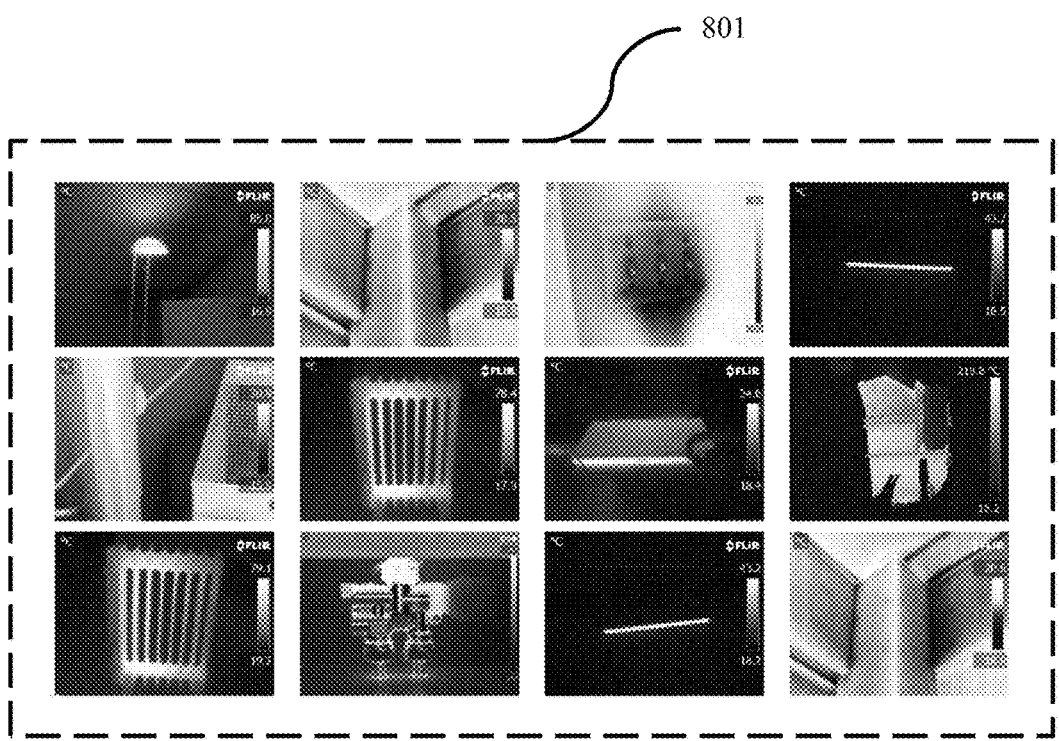
FIG. 8 shows an example of a visual representation of a set of images in accordance with one or more embodiments of the disclosure.

FIG. 8 shows an example of a visual representation of a set 801 of unsorted thermal images, for example representing a selection of, or all, pictures stored in a memory of a thermal imaging device, or stored in another memory device, database or server that the image processing system 100 is configured to communicate with or receive data from. FIG. 8 illustrates an image storage comprising different images depicting the same real world scene, object or feature.

Figure 9:
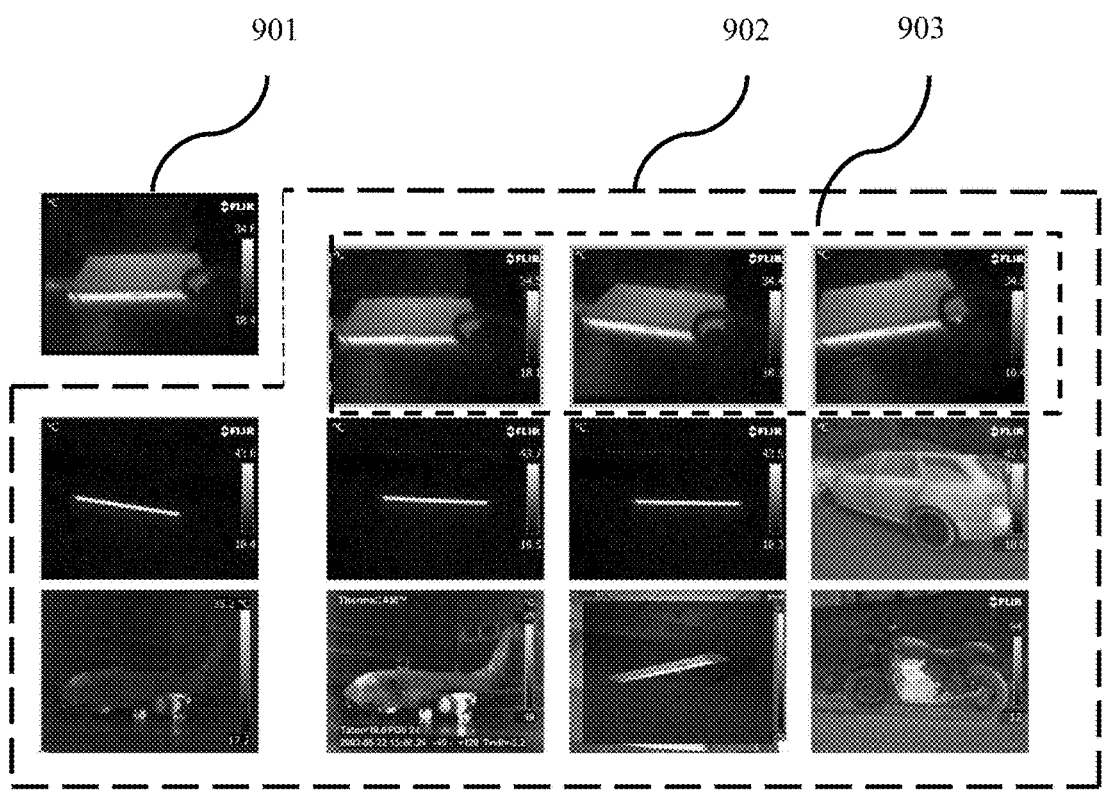
FIG. 9 shows an example of a visual representation of a set of images in accordance with one or more embodiments of the disclosure.

FIG. 9 shows a selected reference image 901, a first retrieved set of images 902 retrieved according to any of the method embodiments presented herein and a second set of images 903. The second set of images 903 is a subset of the first set of images 902 and includes the images determined to most likely represent the same observed real world scene or having been selected by a user in any manner described herein. In the example of FIG. 9, the retrieved images in the first set 902 are sorted based on their similarity with the reference image in descending order.

Figure 10:
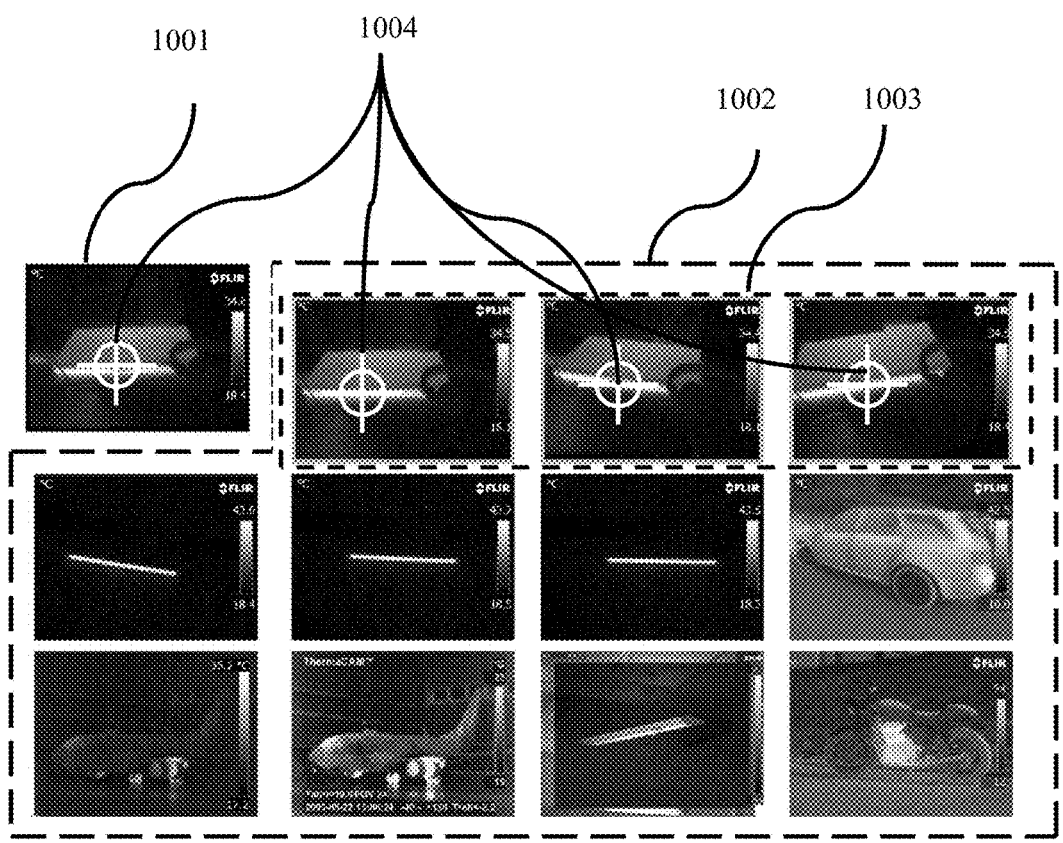
FIG. 10 shows an example of a visual representation of a set of images in accordance with one or more embodiments of the disclosure.

FIG. 10 shows a selected reference image 1001, a retrieved first set of images 1002 and a second set of images 1003 retrieved according to one or more embodiments presented herein. The second set of images 1003 is a subset of the first set of images 1002 and includes the images that are most likely to represent the same observed real world scene or is selected by a user in any manner described herein. In FIG. 10 the reference image 1001, the first set of retrieved images 1002 and the second set of retrieved images 1003 have been provided with a thermographic tool 1004. In FIG. 10, the thermographic tools are exemplified as "spot tools," presented, for example, as hair cross markers in the visual representations of the thermal images. As described herein, the thermographic tools 1004 may be determined and placed in the second set of images 1003, or in the entire first set of images 1002 based on a determined measurement location in the reference image 1001 based on a transformation function associated with each image in the first set of images 1002.

In embodiments, the reference image 1001, the first set 1002 of images and the second set of images 1003 are presented to a user on a display 110, 210 (as shown in FIGS. 1 and 2). For example, the display of the thermal images may be configured such that the reference image 1001 is presented in the top left portion of the display 110, 210 and the images in the first set of images 1002 are sorted and presented left to right and top-down based on a decreasing order of the reference image to image similarity value of each respective image. In yet an example, only images with a reference image to image similarity value above a predetermined threshold value may be presented. In yet an example, the total number of presented images is determined by a preset value or by a value received from user via the inputter 120, 220 (as shown in FIGS. 1 and 2) by the processor 110 as a control signal based on user input.

In embodiments, analysis over time may comprise investigating a possible anomaly by comparing thermal image data from images captured at different points in time. Such thermal image data may comprise for example a measured temperature value or other radiometric or otherwise IR related value, obtained, retrieved or extracted using one or more thermographic tool(s) associated with, placed on or located on a thermal image. A reference image is for example captured at a first, often recent, point in time and is compared to one or more second thermal image(s) captured at different second point(s) in time, typically being earlier than the first point in time.

In a use case example, a user may be viewing, on a GUI shown on a display, a recently captured thermal image and identifying a feature of interest in the image indicating e.g. a temperature that seems abnormally high or abnormally low, depending on what is investigated. The display may e.g. be integrated in, connected or coupled to a thermal imaging device in the form of an IR camera or to a thermal image processing device, e.g. being configured to process stored and retrieved thermal image data captured using a thermal imaging device. In this use case example, the user wants to analyze whether this is in fact an anomaly that needs to be reported or fixed. Using the system and methods of embodiments of the disclosure, the user selects the captured image as a reference image. This is achieved for example by marking the image, or possibly, e.g. if the user is on site, capturing a new thermal image of the scene to be analyzed, whereby the captured image may be automatically selected as a reference image or selected as a reference image in response to a selection input from the user. After selection of the reference image, the user may provide additional input triggering the system to retrieve one or more thermal images showing the same scene, feature or object from a data storage. The system retrieves the requested thermal images, through any of the embodiments described herein, and may display a visual representation of the retrieved thermal images to the user via the GUI. In the displayed visual representations of the thermal images, one or more thermographic tools are typically visible, for example placed by the user on a pixel or area of interest in the reference image, the user having marked this pixel coordinate, spot or area by interacting with the GUI, and placed on the corresponding feature in the retrieved images by the system performing any of the methods described herein. Typically, the temperature, or other thermal or radiometric value of interest, is indicated in the visual representation by pseudo coloring and/or by displaying numerical values associated with at least the marked pixel or area of interest. The user is thereby enabled to compare the reference image to the one or more retrieved images to determine whether the analyzed point or area of the scene in fact relates to a phenomenon or feature of interest, e.g. a problem that needs to be addressed.

In some embodiments, analysis over time may comprise performing trending of data, wherein retrieved thermal image data values, image pixel values or pixel data values, such as temperature values or other radiometric or otherwise thermally related values, retrieved using one or more thermographic tool associated with, placed on or located on the thermal images, may be combined with traditional meta-data such as date, time, etc. and used in trend analysis, for example, by plotting, exporting to tables or generating other suitable data structures.

Figure 11:
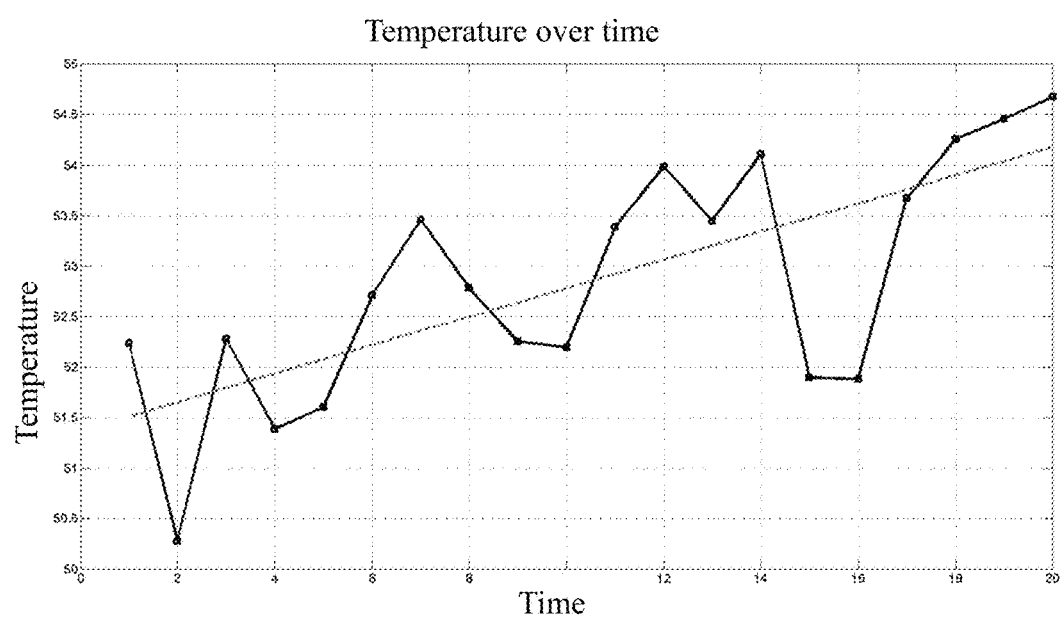
FIG. 11 shows an example of a trending graph plotting measurement values over time in accordance with one or more embodiments of the disclosure.

FIG. 11 shows an example of a trending graph that may be obtained according to embodiments of the disclosure, wherein the example trending graph plots measurement values over time in one possible manner. The example graph of FIG. 11 illustrates a measured temperature that rises over time. For example, this may indicate an undesirable trend, if the measured object/area is for example approaching or exceeding a threshold value (not shown in FIG. 11) indicating what is an allowable maximum temperature.

As is evident to a person skilled in the art, trending may be used to find any type of development of interest, including but not limited to anomalies appearing at a certain point in time, unexpected changes over time or at a certain point in time, temperature values that are rising or decreasing over time, and/or whether the temperature values are constant/stable or indicate undesirably large or small fluctuations over time. Different variants of per se known trend analysis methods may be used in embodiments of the disclosure.

Advantages

In embodiments of the disclosure, the location of a certain scene feature, scene object or area, depicted in thermal images is determined and a transformation function is generated such that a thermographic tool can be placed on the correct feature in retrieved thermal images, i.e. the feature that corresponds to the feature in the depicted scene on which the thermographic tool is located in the reference image. Since the feature is identified and determined for each thermal image in a set of retrieved thermal images and a corresponding transformation function is generated for each image, the need to align the selected thermal images against the reference image is eliminated.

This provides at least the following individual and/or combined advantages:

Fast retrieval of images from a large number of available images in one or more databases.

Eliminated need to store only relevant images in a database/folder.

Eliminated need to store all relevant images in a common database/folder.

Automatic selection of images to be comprised in the first set of images.

Eliminated need for alignment of the selected images.

Automatic placement of tools onto the corresponding scene features (objects, areas) in each of the selected images respectively.

More accurate placement of tools onto the corresponding scene features in each of the selected images. This is particularly notable compared to solutions where the images are aligned manually and the thermographic tools are e.g. simply placed on the same image coordinates for all images.

Using the indexation of embodiments presented herein, even for very large databases such as hundreds of thousands of images these operations and calculations may be performed in near real-time.

Further, as provided by embodiments, the user will benefit from the following:

Knowing that captured images may be compared and analyzed at a later time even if they are not captured from the same view point and/or distance, and even if the captured images are not stored in a common database or folder, or marked in any way to indicate that they depict the same scene or object, for example. This saves the user a lot of time at capturing, since the user does not have to make sure that certain conditions are fulfilled, for example by using a stationary imaging device or alignment assistance, before capturing a thermal image.

Finding all images showing a given thermal scene or feature, even if they were not captured from the same location and/or not stored in common, in other words even if it is not known beforehand that the images depict the same scene. This further saves time and achieves higher precision at retrieval and processing of images, as the need for manual input is minimized.

Quickly and easily find and analyze possible problems and/or anomalies by comparing a reference image with one or more retrieved image.

Automatic scene comparison over time, such as trend analysis, being enabled.

A higher precision and more accurate placement of tools onto the corresponding scene features (objects, areas) in each of the selected images respectively is achieved in this image processing step, compared to solutions where the images are aligned (more or less imperfectly) and the thermographic tools are, for example, simply placed on the same image coordinates for all images.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa. Where applicable, the ordering of various steps described herein can be changed, combined into composite steps, and/or separated into sub-steps to provide features described herein.

Software in accordance with the present disclosure, such as program code and/or data, can be stored in non-transitory form on one or more machine-readable mediums. It is also contemplated that software identified herein can be implemented using one or more general purpose or specific purpose computers and/or computer systems, networked and/or otherwise.

In embodiments, there are provided a computer program product comprising computer readable code configured to, when executed in a processor, perform any or all of the method steps described herein. In embodiments, there are provided a non-transitory computer readable memory on which is stored computer readable and computer executable code configured to, when executed in a processor, perform any or all of the method steps described herein.

Embodiments described herein illustrate but do not limit the invention. It should also be understood that numerous modifications and variations are possible in accordance with the principles of the invention. Accordingly, the scope of the invention is defined only by the following claims.

The invention claimed is:

1. A method comprising:
    receiving, by one or more processors, a thermal image;
    generating, by the one or more processors, at least one image descriptor for the thermal image based at least on content of the thermal image;
    generating, by the one or more processors, an image file, wherein the image file comprises the thermal image and the at least one image descriptor;
    providing, by the one or more processors, the image file for storage in a data storage; and
    retrieving, by the one or more processors from the data storage, one or more image files based on a reference image depicting a scene and one or more image descriptors, wherein each of the one or more image files comprises a respective thermal image and a respective set of image descriptors.

2. The method of claim 1, further comprising:
    determining, by the one or more processors, a measurement location in the reference image; and
    for each of the one or more retrieved image files:
        determining, by the one or more processors, a corresponding measurement location in the respective thermal image of the retrieved image file, and
        placing, by the one or more processors, a thermographic tool on the corresponding measurement location in the respective thermal image.

3. The method of claim 2, wherein the determining the corresponding measurement location in the respective thermal image comprises applying a transformation function that describes a geometric relationship between the measurement location in the reference image and the corresponding measurement location in the respective thermal image.

4. The method of claim 3, wherein the transformation function comprises a transformation matrix comprising rotation, translation, scale, and skew parameters representing the geometric relationship between the measurement location in the reference image and the corresponding measurement location in the respective thermal image.

5. The method of claim 2, wherein the determining the measurement location in the reference image comprises:
    receiving a control signal generated in response to a user input marking the measurement location in the reference image; and
    obtaining, in response to the control signal, one or more coordinates representing the measurement location.

6. The method of claim 2, wherein the determining the measurement location in the reference image is based on the location of the thermographic tool placed on the reference image.

7. The method of claim 2, wherein the placing the thermographic tool comprises:
    determining the thermographic tool in response to a user input control signal indicating the thermographic tool; or
    determining a preset thermographic tool.

8. The method of claim 1, wherein the image file is indexed in the data storage based on the at least one image descriptor of the image file.

9. The method of claim 1, further comprising determining, by the one or more processors, the reference image.

10. The method of claim 9, wherein the determining the reference image is based on a control signal indicating a user selected reference image and/or on predetermined rules for selecting a captured or previously stored image as the reference image.

11. The method of claim 1, further comprising determining, by the one or more processors for each of the one or more retrieved image files, a respective similarity measure between the reference image and the respective thermal image of the retrieved image file, wherein the retrieving is based on each respective similarity measure.

12. The method of claim 11, wherein the respective similarity measure is based on a set of image descriptors associated with the reference image and the respective set of image descriptors of the retrieved image file.

13. The method of claim 1, further comprising capturing, by an infrared (IR) camera, the thermal image of the scene.

14. The method of claim 13, further comprising determining, by the one or more processors, the reference image, wherein the thermal image is determined as the reference image in response to the capturing the thermal image by the IR camera.

15. A non-transitory machine-readable medium on which is stored machine-readable code which, when executed by a processor of a remote inspection system, controls the processor to perform the method of claim 1.

16. A thermal image processing system comprising:
  a display configured to display images;
  one or more inputters configured to receive user input and to generate control signals in response to said received user input; and
  a processor communicatively coupled to the display and the one or more inputters, the processor configured to:
    receive a thermal image;
    generate at least one image descriptor for the thermal image based at least on content of the thermal image;
    generate an image file, wherein the image file comprises the thermal image and the at least one image descriptor;
    provide the image file for storage in a data storage; and
    retrieve, from the data storage, one or more image files based on a reference image depicting a scene and one or more image descriptors, wherein each of the one or more image files comprises a respective thermal image and a respective set of image descriptors.

17. The thermal image processing system of claim 16, wherein the processor is further configured to:
  determine a measurement location in the reference image; and
  for each of the one or more retrieved image files:
    determine a corresponding measurement location in the respective thermal image of the retrieved image file, and
    place a thermographic tool on the corresponding measurement location in the respective thermal image.

18. The thermal image processing system of claim 16, wherein:
  the image file is indexed in the data storage based on the at least one image descriptor of the image file,
  the processor is further configured to determine, for each of the one or more retrieved image files, a respective similarity measure between the reference image and the respective thermal image of the retrieved image file, and
  the processor is configured to retrieve the one or more thermal image files based on each respective similarity measure.

19. The thermal image processing system of claim 18, wherein the respective similarity measure is based on a set of image descriptors associated with the reference image and the respective set of image descriptors of the retrieved image file.

20. The thermal image processing system of claim 16, further comprising an infrared (IR) camera configured to capture the thermal image of the scene.

\* \* \* \* \*

UNITED STATES PATENT AND TRADEMARK OFFICE
CERTIFICATE OF CORRECTION

PATENT NO. : 10,180,950 B2  
APPLICATION NO. : 15/960453  
DATED : January 15, 2019  
INVENTOR(S) : Martin Solli and Stefan Bergstrom Page 1 of 1

It is certified that error appears in the above-identified patent and that said Letters Patent is hereby corrected as shown below:

In the Claims

In Column 22, Line 27, Claim 18 change "thermal image files" to --image files--

Signed and Sealed this
Eighteenth Day of June, 2019

Andrei Iancu
*Director of the United States Patent and Trademark Office*